(12) United States Patent
Siu

(10) Patent No.: US 7,677,721 B2
(45) Date of Patent: Mar. 16, 2010

(54) INTERCHANGEABLE DECORATIVE ARRANGEMENT FOR SPECTACLES

(76) Inventor: Yu Siu, Flat No. 3, 18 Floor, Block K, Kam Tal Court, 33 Bning Tal Road, Shatin New Territories, Hong Kong (HK)

( * ) Notice: Subject to any disclaimer, the term of this patent is extended or adjusted under 35 U.S.C. 154(b) by 308 days.

(21) Appl. No.: 11/799,283

(22) Filed: Apr. 30, 2007

(65) Prior Publication Data

US 2008/0284974 A1 Nov. 20, 2008

(51) Int. Cl.
*G02C 11/02* (2006.01)
(52) U.S. Cl. .......................................... 351/52; 351/51
(58) Field of Classification Search .................. 351/51, 351/52, 158, 111, 121, 41, 116, 153; 16/228
See application file for complete search history.

(56) References Cited

U.S. PATENT DOCUMENTS 5,398,377 A * 3/1995 Takiyama .................... 16/228

6,120,146 A * 9/2000 Harris ......................... 351/158
2008/0259269 A1* 10/2008 Grogan et al. ................. 351/52

FOREIGN PATENT DOCUMENTS

GB 2184862 A * 7/1987

\* cited by examiner

*Primary Examiner*—Hung X Dang
(74) *Attorney, Agent, or Firm*—Raymond Y. Chan; David and Raymond Patent Firm

(57) ABSTRACT

A spectacle frame includes two lenses, a frame body holding said two lenses in position, and an interchangeable decorative arrangement which includes one or more personalizing elements detachably and interchangeably affixing at a personalizing portion of the frame body, wherein the personalizing element, having a shape corresponding to the personalizing portion of said frame body, forms an add-on personal decorative item to personify the frame body so as to enhance an aesthetic appearance of the spectacle frame.

10 Claims, 6 Drawing Sheets

INTERCHANGEABLE DECORATIVE ARRANGEMENT FOR SPECTACLES

BACKGROUND OF THE PRESENT INVENTION

1. Field of Invention

The present invention relates to a spectacle frame, and more particularly to a spectacle frame which comprises an interchangeable arrangement to personify the spectacle frame so as to enhance an aesthetic appearance of the spectacle frame.

2. Description of Related Arts

Nowadays, people try to create their uniqueness and enjoy their own lifestyle. For example, they always try to look for different designs of clothing and spectacle frames to mix and match with the clothing. However, it is a hassle for the people to carry two or more spectacle frames at the same time. Especially for the prescription spectacle, the wearer may feel uncomfortable when he or she switches from the "daily-wearing" spectacle frame to another "back-up wearing" spectacle frame. In addition, the spectacle manufactures will only mass produce the spectacle frames with the same style and design to reduce the manufacturing cost thereof. Even though the appearance of the spectacle frame is novel and aesthetic, it stills lack of personality in individual. Therefore, hundreds of wearers may wear the same style and same color of the spectacle frame. In other words, it is impossible for the spectacle manufacturer to only manufacture a unique spectacle frame for the particular wearer. As a result the wearer can only select the spectacle frame created by the spectacle designer but cannot design his or her own spectacle frame.

SUMMARY OF THE PRESENT INVENTION

A main object of the present invention is to provide a spectacle frame which comprises one or more personalizing elements detachably and interchangeably affixing at the personalizing portion of the frame body so as to enhance an personalize appearance of the spectacle frame.

Another object of the present invention is to provide a spectacle frame, wherein any kinds of material can be used in the spectacle frame such that the consumer can choose the material they want on their spectacle frame.

Another object of the present invention is to provide a spectacle frame, wherein the personalizing elements can be precisely and easily connect on the spectacle frame such that the user can easily replace the accessories they like.

Another object of the present invention is to provide a spectacle frame, wherein the personalizing elements can be constructed as any kinds of existing attaching device such as clipping engagement, magnetic engagement, or resilient engagement.

Another object of the present invention is to provide a spectacle frame, which provides a simple but secure attachment between the spectacle frame and the personalize elements so as to minimize the manufacturing cost of the spectacle frame.

Accordingly, in order to accomplish the above objects, the present invention provides two lenses, a frame body holding the two lenses in position, and an interchangeable decorative arrangement, which comprises one or more personalizing elements detachably and interchangeably affixing at the personalizing portion of the frame body, wherein the personalizing element, having a shape corresponding to the personalizing portion of the frame body, forms an add-on personal decorative item to personify the frame body so as to enhance an aesthetic appearance of the spectacle frame.

These and other objectives, features, and advantages of the present invention will become apparent from the following detailed description, the accompanying drawings, and the appended claims.

DETAILED DESCRIPTION OF THE PREFERRED EMBODIMENT

Figure 1:
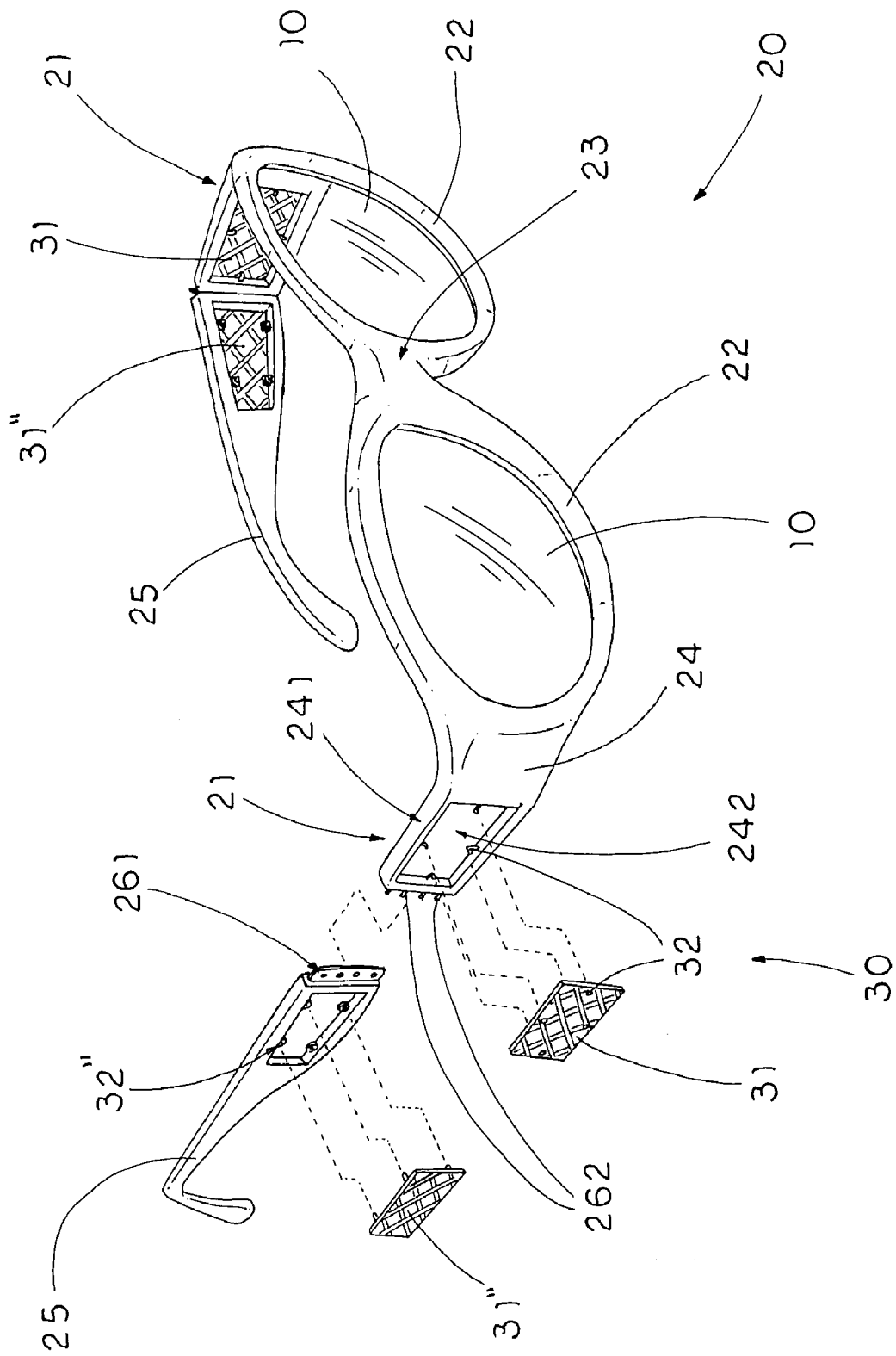
FIG. 1 is a perspective view of a spectacle frame with an interchangeable decorative arrangement according to a first preferred embodiment of the present invention.
Figure 2:
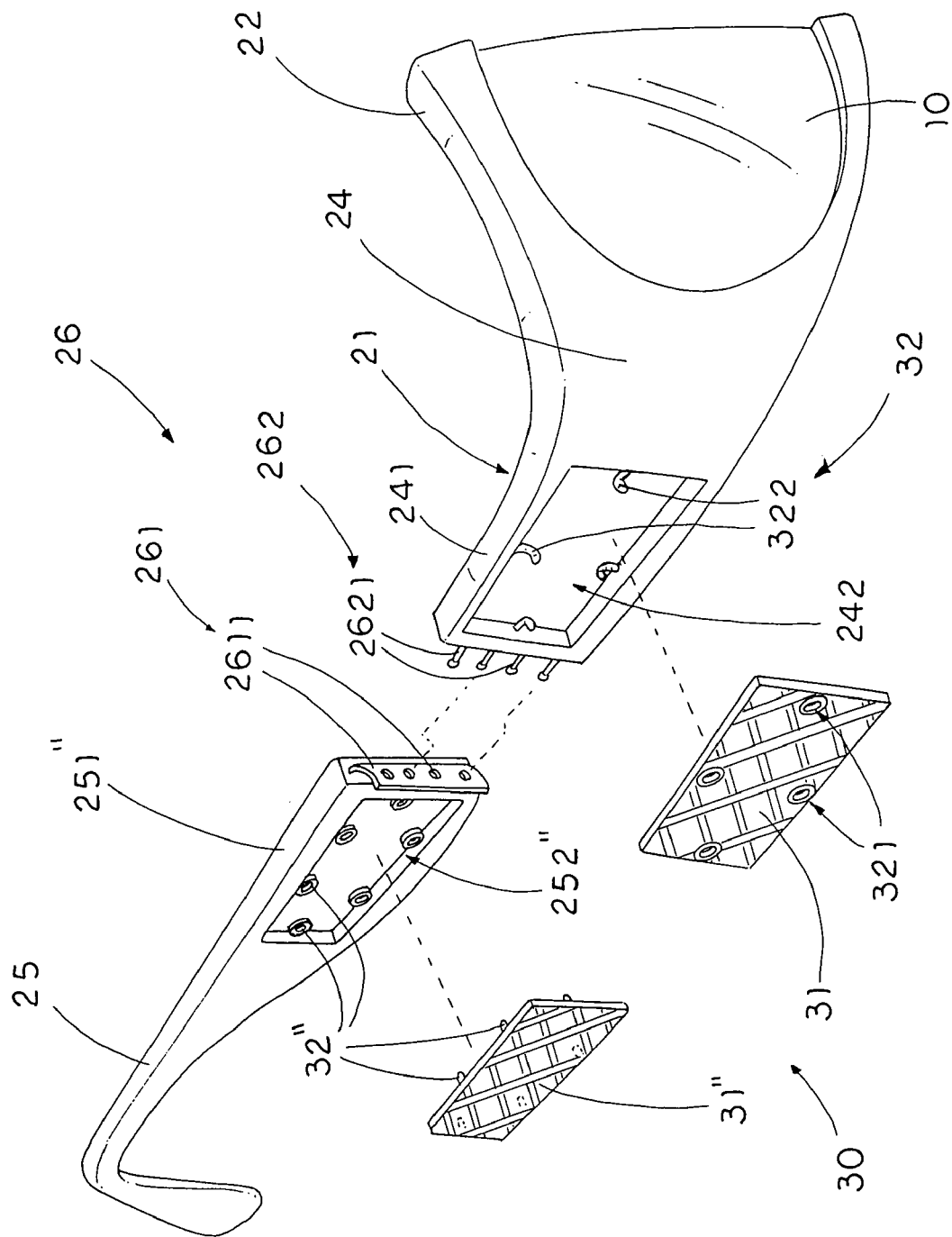
FIG. 2 is a perspective view of the interchangeable decorative arrangement of the spectacle frame according to the above first preferred embodiment of the present invention.

Referring to FIGS. 1 and 2 of the drawings, a spectacle frame according to a first preferred embodiment of the present invention is illustrated, wherein the spectacle frame comprises two lenses 10 and a frame body 20 holding the two lenses 10 in position.

Accordingly, the frame body 20, having a personalizing portion 21, comprises two lens rims 22 encircling the two lenses 10 to hold the lenses 10 in position, a lens bridge 23 extended between two inner sides of the lens rims 22, and two side extensions 24 extended from two outer sides of the lens rims 22 respectively.

The spectacle frame further comprises an interchangeable decorative arrangement 30 for enhancing the personalization of the wearer. The interchangeable decorative arrangement 30 comprises one or more personalizing elements 31 detachably and interchangeably affixing at the personalizing portion 21 of the frame body 20, wherein the personalizing element 31, having a shape corresponding to the personalizing portion 21 of the frame body 20, forms an add-on personal decorative item to personify the frame body 20 so as to enhance an aesthetic appearance of the spectacle frame.

As shown in FIGS. 1 and 2, the personalizing portion 21 of the frame body 20 is defined at each of the side extensions 24 at the outer side thereof such that the personalizing elements 31 are detachably attached to the outer sides of the side extensions 24 respectively to personify the frame body 20. As shown in FIG. 2, each of the side extensions 24 comprises a decorative rim 241 defining an engaging compartment 242 therewithin, wherein the engaging compartment 242 is a through slot formed at the respective side extension 24. In other words, the engaging compartment 242 is indently formed on the outer side of the side extension 24 through an inner side thereof to define the decorative rim 241 at the peripheral edge of the engaging compartment 242.

Each of the personalizing elements 31 comprises a decorative panel having a shape and size corresponding to the engaging compartment 242, wherein the personalizing element 31 is fittingly received in the engaging compartment 242 so as to hold the personalizing element 31 on the respective side extension 24. Most importantly, the decorative panel is a see through panel that when the personalizing elements 31 are mounted within the decorative compartment 242, an predetermined intensity of light can pass through the outer side of the side extension 24 to the inner side thereof through the personalizing elements 31.

According to the preferred embodiment, the frame body 20 is a plastic made frame that the plastic made side extensions 24 is integrally extended from the outer sides of the lens rims 22 respectively. The personalizing element 31 is made of metal such that when the personalizing element 31 is detachably mounted at the side extension 24, two different materials are combined to form the enhanced spectacle frame. It is worth to mention that the personalizing element 31 and the frame body 20 can be made of same material but different colors depending on the intention of the wearer. Therefore, the wearer is able to configure his or her own unique spectacle frame by selectively placing the personalizing elements 31 at the side extension 24 of the frame body 20.

As shown in FIG. 2, the interchangeable decorative arrangement 30 further comprises a mounting unit 32 which contains a plurality of engaging slots 321 spacedly formed along a peripheral edge of each of the personalizing elements 31 and comprises a plurality of engaging arms 322 which are spacedly extended from the decorative rim 241 within the engaging compartment 242 and are detachably engaged with the engaging slots 321 respectively so as to lock up the personalizing elements 31 at the side extensions 24 respectively. It is worth to mention that when the personalizing element 31 is mounted at the engaging compartment 242, the personalizing element 31 is aligned with the outer side of the side extension 24.

According to the preferred embodiment, each of the engaging arms 322 has a hooking end hooking at the respective engaging slot 322 to securely retain the personalizing element 31 in position. Preferably, the personalizing element 31 has a rectangular shape corresponding to the rectangular shaped decorative compartment 242, wherein there are four engaging arms 322 extended from four edges of the decorative rim 241 to detachably engage with four engaging slots 322 formed at four edge portions of the personalizing element 31. In addition, each of the engaging arms 322 is a flexible member adapted to be slightly bent to alignedly engage with the respective engaging slot 322. Having such attaching configuration, the personalizing element 31 can be made of metal, plastic or even a piece of fabric to be detachably held at the side extension 24 of the frame body 22.

The frame body 20 further comprises two temples 25 and two temple connectors 26 for detachably and pivotally coupling the temples 25 with the side extensions 24 respectively. As shown in FIGS. 1 and 2, each of the temple connectors 26 comprises a connector piece 261 extended from an end of the respective temple 25, and a connector head 262 extended from the respective side extension 24 to detachably and pivotally couple with the connector piece 261.

Accordingly, the connector piece 261 has a plurality of spaced apart pivot slots 2611 alignedly and transversely formed along the end of the temple 25. The connector head 262 has a plurality of spaced apart connector plugs 2621 extended from the respective side extension 24, wherein the connector plugs 2621 of the connector head 262 are detachably inserted into the pivot slots 2611 of the connector piece 261 respectively so as to allow the temple 25 pivotally and detachably coupling with the respective side extension 24. Each of the connector plugs 2621, which is made of elastic material adapted to be slightly deformed to fittingly insert into the respective pivot slot 2611, has an enlarged head portion and an elongated neck portion extended from the end of the temple 25 to the head portion. According to the preferred embodiment, the connector plugs 2621 are inserted into the pivot slots 2611 respectively from the inner side of the connector piece 261 to the outer side thereof such that when the connector head 262 is detachably couple with the connector piece 261, the temple 25 is adapted to be pivotally fold with respect to the side extension 24.

Since the temples 25 can be detached from the side extensions 24 respectively, the wearer is able to interchange the temples 25 as well as the personalizing element 31. Therefore, the wearer is able to selectively design the spectacle frame by interchanging the personalizing elements 31 and the temples 25 to create the unique appearance of the spectacle frame for his or her own.

Figure 3:
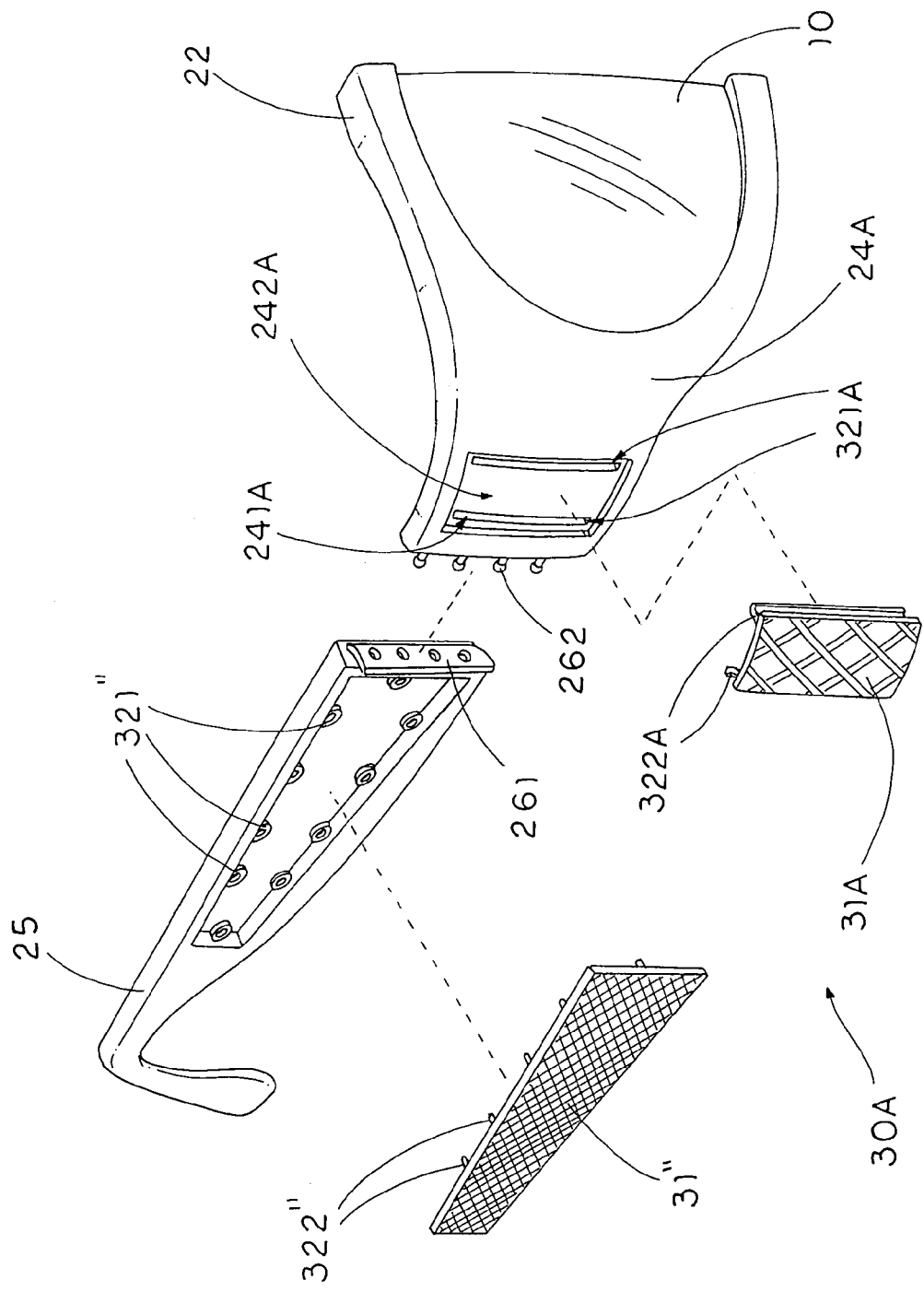
FIG. 3 illustrates an alternative mode of the interchangeable decorative arrangement according to the above first preferred embodiment of the present invention.

FIG. 3 illustrates an alternative mode of the side extension 24A to incorporate with the personalizing element 31A. Accordingly, each of the side extensions 24A comprises a decorative rim 241A defining an engaging compartment 242A therewithin, wherein the engaging compartment 242A is indently formed at the respective side extension 24A. In other words, the engaging compartment 242A is an indention formed at the side extension 24A to define the decorative rim 241A at the peripheral edge of the engaging compartment 242A.

Each of the personalizing elements 31A comprises a decorative panel having a shape and size corresponding to the engaging compartment 242A, wherein the personalizing element 31A is fittingly received in the engaging compartment 242A so as to hold the personalizing element 31 on the respective side extension 24A.

The interchangeable decorative arrangement 30A further comprises a mounting unit 32A which contains an engaging groove 321A indently formed at a wall of the engaging compartment 242A and comprises an engaging tongue 322A which is protruded from a surface of the personalizing element 31A and is slidably engaged with the engaging groove 321A so as to lock up the personalizing element 31A at the respective side extension 24A. Preferably, the engaging tongue 322A is made of elastic material, such as rubber, such that when the engaging tongue 322A is slid into the engaging groove 321A, the engaging tongue 322A is slightly deformed to fit into the engaging tongue 322A and is adapted to apply an elastic force thereto for retaining the personalizing element 31A at the respective side extension 24A. In other words, the wearer is able to selectively mount the personalizing element 31A at the side extension 24A by pressing the engaging tongue 322A into the engaging groove 321A such that the personalizing element 31A is mounted at the engaging compartment 242A. It is worth to mention that the thickness of the personalizing element 31A is corresponding to the depth of the engaging compartment 242A, such that when the personalizing element 31A is mounted at the engaging compartment 242A, the personalizing element 31A is aligned with the outer side of the side extension 24A.

Figure 4:
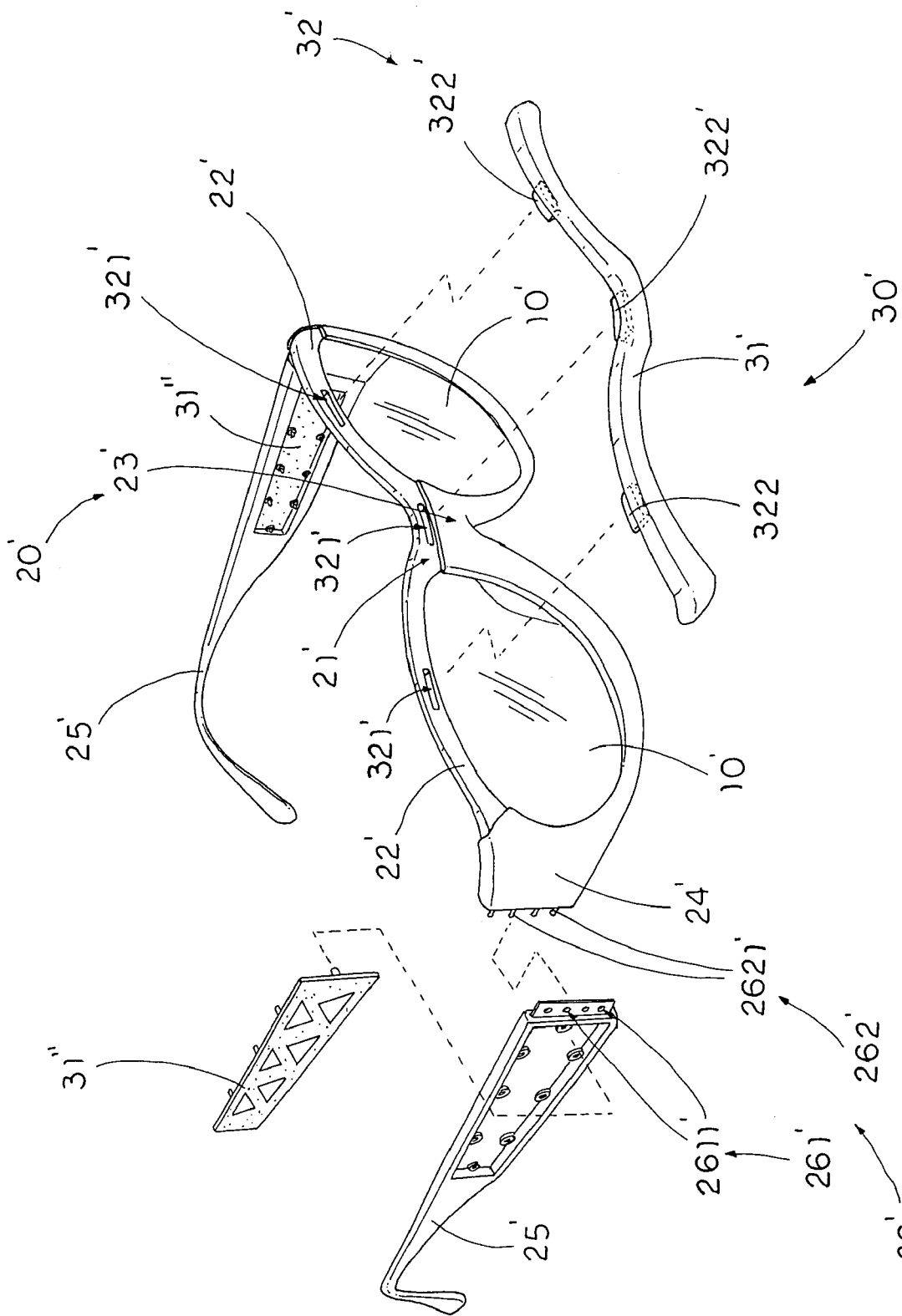
FIG. 4 is a perspective view of a spectacle frame with an interchangeable decorative arrangement according to a second preferred embodiment of the present invention.

As shown in FIG. 4, a spectacle frame of a second embodiment illustrates an alternative mode of the first embodiment of the present invention, wherein the spectacle frame comprises two lenses 10' and a frame body 20' holding the two lenses 20' in position.

Accordingly, the frame body 20', having a personalizing portion 21', comprises two lens rims 22' encircling the two lenses 10' to hold the lenses 10' in position, a lens bridge 23' extended between two inner sides of the lens rims 22', and two side extensions 24' extended from two outer sides of the lens rims 22' respectively.

The spectacle frame further comprises an interchangeable decorative arrangement 30' for enhancing the personalization of the wearer. The interchangeable decorative arrangement 30' comprises one or more personalizing elements 31' detachably and interchangeably affixing at the personalizing portion 21' of the frame body 20', wherein the personalizing element 31', having a shape corresponding to the personalizing portion 21' of the frame body 20', forms an add-on personal decorative item to personify the frame body 20' so as to enhance an aesthetic appearance of the spectacle frame.

According to the second embodiment, the personalizing portion 21' is formed at an upper portion of each of the lens rims 22' and at the lens bridge 23' which is integrally extended between the upper portions of the lens rims 22'. In other words, the personalizing portion 21' of the frame body 20' is provided at the front side thereof from one of the upper portion of the lens rims 22' to another upper portion of the lens rim 22' through the lens bridge 23' to form an elongated portion.

The personalizing element 31' comprises an elongated decorative strip, having a shape and size corresponding to the personalizing portion 21' of the frame body 20', detachably engaging with the lens bridge 23' and the upper portions of the lens rims 22' to align with the personalizing portion 21'. Similar to the first embodiment, the frame body 20' is a plastic made frame and the personalizing element 31' can be made of metal such that two different materials are combined to form the spectacle frame. In addition, the frame body 20' and the personalizing element 31' can be made of same material, such as plastic, but different colors. Therefore, the wearer is able to configure his or her own unique spectacle frame by selectively placing the personalizing elements 31' at the front side of the frame body 20'.

The interchangeable decorative arrangement 30' further comprises a mounting unit 32' which contains a plurality of engaging grooves 321' indently formed at the upper portions of the lens rims 22' and the lens bridge 23' of the frame body 20' at the front side thereof within the personalizing portion 21', and comprises a plurality of engaging tongues 322' which are protruded from a surface of the personalizing element 31' and are slidably engaged with the engaging grooves 321' respectively so as to lock up the personalizing element 31' at the at front side of the frame body 20'. Preferably, the engaging tongue 322' is made of elastic material, such as rubber, such that when the engaging tongue 322' is slid into the engaging tongue 322', the engaging tongue 322' is slightly deformed to fit into the respective engaging groove 321' and is adapted to apply an elastic force thereto for retaining the personalizing element 31' at the respective side extension 24'.

According to the second embodiment, the frame body 20' further comprises two temples 25' and two temple connectors 26' for detachably and pivotally coupling the temples 25' with the side extensions 24' respectively. As shown in FIG. 4, each of the temple connectors 26' comprises a connector piece 261' extended from an end of the respective temple 25', and a connector head 262' extended from the respective side extension 24' to detachably and pivotally couple with the connector piece 261'.

Accordingly, the connector piece 261' has a plurality of spaced apart pivot slots 2611' alignedly and transversely formed along the end of the temple 25'. The connector head 262' has a plurality of spaced apart connector plugs 2621' extended from the respective side extension 24', wherein the connector plugs 2621' of the connector head 262' are detachably inserted into the pivot slots 2611' of the connector piece 261' respectively so as to allow the temple 25' pivotally and detachably coupling with the respective side extension 24'. Each of the connector plugs 2621', which is made of elastic material adapted to be slightly deformed to fittingly insert into the respective pivot slot 2611', has an enlarged head portion and an elongated neck portion extended from the end of the temple 25' to the head portion. According to the preferred embodiment, the connector plugs 2621' are inserted into the pivot slots 2611' respectively from the inner side of the connector piece 261' to the outer side thereof such that when the connector head 262' is detachably couple with the connector piece 261', the temple 25' is adapted to be pivotally fold with respect to the side extension 24'.

Since the temples 25' can be detached from the side extensions 24' respectively, the wearer is able to interchange the temples 25' as well as the personalizing element 31'. Therefore, the wearer is able to selectively design the spectacle frame by interchanging the personalizing elements 31' and the temples 25' to create the unique appearance of the spectacle frame for his or her own.

Figure 5:
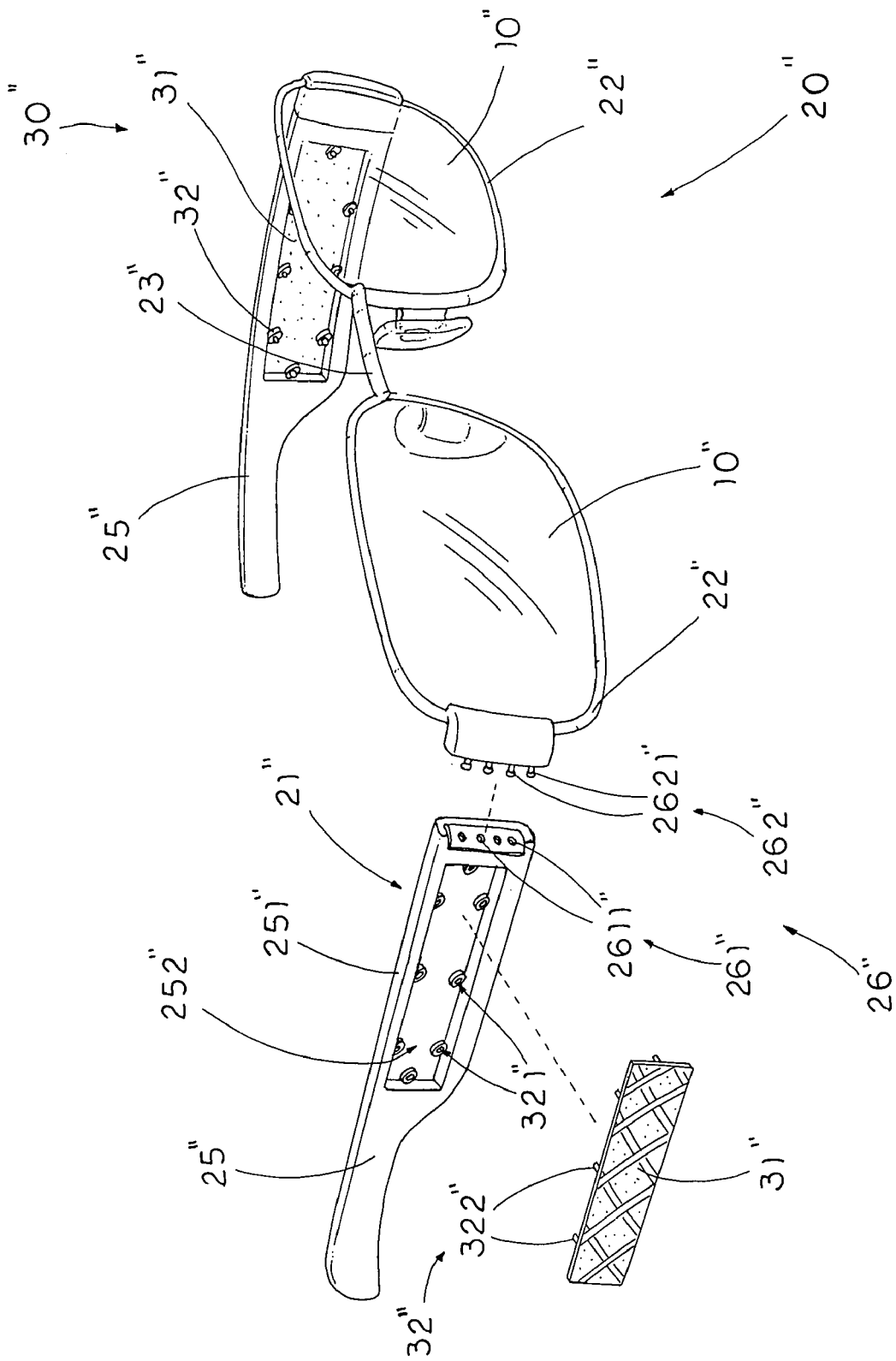
FIG. 5 is a perspective view of a spectacle frame with an interchangeable decorative arrangement according to a third preferred embodiment of the present invention.

As shown in FIG. 5, a spectacle frame of a third embodiment illustrates an alternative mode of the first and second embodiments of the present invention, wherein the spectacle frame comprises two lenses 10" and a frame body 20" holding the two lenses 20" in position.

The frame body 20'", having a personalizing portion 21", comprises two lens rims 22" encircling the two lenses to hold the lenses 10" in position, a lens bridge 23" extended between two inner sides of the lens rims 22", and two temples 25" pivotally extended from two outer sides of the lens rims 22" respectively. Accordingly, the two side extensions 24, 24' of the first and second embodiments can be omitted in the third embodiment or the side extensions 24, 24' can be parts of the lens rims 22" that the side extensions 24, 24' are integrally formed with the two outer sides of the lens rims 22" of the third embodiment.

The spectacle frame further comprises an interchangeable decorative arrangement 30" for enhancing the personalization of the wearer. The interchangeable decorative arrangement 30" comprises one or more personalizing elements 31" detachably and interchangeably affixing at the personalizing portion 21" of the frame body 20", wherein the personalizing element 31", having a shape corresponding to the personalizing portion 21" of the frame body 20", forms an add-on personal decorative item to personify the frame body 20" so as to enhance an aesthetic appearance of the spectacle frame.

According to the third embodiment, the personalizing portion 21" is formed at each of the temples 25" such that the personalizing elements 31" are detachably attached to outer sides of the temples 25" respectively to personify the frame body 20".

Each of the temples 25" contains an engaging compartment 252" formed at the outer side thereof to receive the personalizing element 31" in the engaging compartment 251". Accordingly, the engaging compartment 252" is indently formed at the outer side of the temple 25". In other words, the engaging compartment 252" is an indention formed at the outer side of the temple 25" to define a decorative rim 251" at the peripheral edge of the engaging compartment 252".

Each of the personalizing elements 31" comprises an elongated decorative panel, having a shape and size corresponding to the engaging compartment 252", fittingly receiving in the engaging compartment 252" so as to hold the personalizing element 31" on the outer side of the respective temple 25". Similar to the first and second embodiments, the temples 25" can be made of plastic while the personalizing element 31" is made of metal, such that the spectacle frame is constructed to contain two different materials. In addition, the temple 25" and the personalizing element 31" can be made of same material, such as plastic, but different colors. Therefore, the wearer is able to configure his or her own unique spectacle frame by selectively placing the personalizing elements 31" at the outer side of the temple 25".

The interchangeable decorative arrangement 30" further comprises a mounting unit 32" which contains a plurality of engaging slots 321" spacedly formed along the outer side of each of the temples 25" and comprises a plurality of engaging arms 322" which are spacedly protruded from each of the personalizing elements 31" and are detachably engaged with the engaging slots 321" respectively so as to lock up the personalizing elements 31" at the outer sides of the temples 31" respectively. It is worth to mention that the thickness of the personalizing element 31" is corresponding to the depth of the engaging compartment 252", such that when the personalizing element 31" is mounted at the engaging compartment 252", the personalizing element 31" is aligned with the outer side of the temple 25".

Preferably, each of the engaging arms 322", which is made of elastic material, having an enlarged head portion and an elongated neck portion extended from the surface of the personalizing element 31" to the head portion, such that when the engaging arm 322" is slidably inserted into the engaging slot 321", the engaging arm 322" is adapted to be slightly deformed to fit into the respective engaging slot 321".

The frame body 20" further comprises two temple connectors 26" for detachably and pivotally coupling the temples 25" with the outer sides of the lens rims 22" respectively. Each of the temple connectors 26" comprises a connector piece 261 extended from an end of the respective temple 25", and a connector head 262" extended from the respective lens rim 22" to detachably and pivotally couple with the connector piece 261".

Accordingly, the connector piece 261" has a plurality of spaced apart pivot slots 2611" alignedly and transversely formed along the end of the temple 25". The connector head 262" has a plurality of spaced apart connector plugs 2621" extended from the respective lens rim 22", wherein the connector plugs 2621" of the connector head 262" are detachably inserted into the pivot slots 2611" of the connector piece 261" respectively so as to allow the temple 25" pivotally and detachably coupling with the respective lens rim 22". Each of the connector plugs 2621", which is made of elastic material adapted to be slightly deformed to fittingly insert into the respective pivot slot 2611", has an enlarged head portion and an elongated neck portion extended from the end of the temple 25" to the head portion. According to the preferred embodiment, the connector plugs 2621" are inserted into the pivot slots 2611" respectively from the inner side of the connector piece 261" to the outer side thereof such that when the connector head 262" is detachably couple with the connector piece 261", the temple 25" is adapted to be pivotally fold with respect to the lens rim 22".

Since the temples 25" can be detached from the lens rims 22" respectively, the wearer is able to interchange the temples 25" and the personalizing element 31". Therefore, the wearer is able to selectively design the spectacle frame by interchanging the personalizing elements 31" and the temples 25" to create the unique appearance of the spectacle frame for his or her own.

Accordingly, the present invention provides a simple but secure attachment between the frame body 20, 20', 20" and the personalize elements 31, 31', 31" via the mounting unit 32, 32', 32" so as to minimize the manufacturing cost of the spectacle frame. Moreover, the personalizing elements 31, 31', 31" can be precisely and easily mounted on the frame body 20, 20', 20" such that the user can easily replace the accessories they like. In addition, the mounting units 32, 32', 32" of the first to third embodiments only illustrate some detachably attaching methods to couple the personalize elements 31, 31', 31" with the frame body 20, 20', 20". It should be obvious for one person who skilled in that art to modify the mounting units 32, 32', 32". For example, the personalize elements 31, 31', 31" can be simply coupled with the frame body 20, 20', 20" by adhesive that the personalize elements 31, 31', 31" can be removed from and reusably placed on the frame body 20, 20', 20" without damaging the structures of the personalize elements 31, 31', 31" and the frame body 20, 20', 20". It is worth to mention that the personalize elements 31, 31', 31" can be formed with a 3-dimensional structure such that when the personalize elements 31, 31', 31" are mounted on the frame body 20, 20', 20", the personalize elements 31, 31', 31" are protruded from the frame body 20, 20', 20" to enhance the 2-dimensional surface thereof.

Figure 6B:
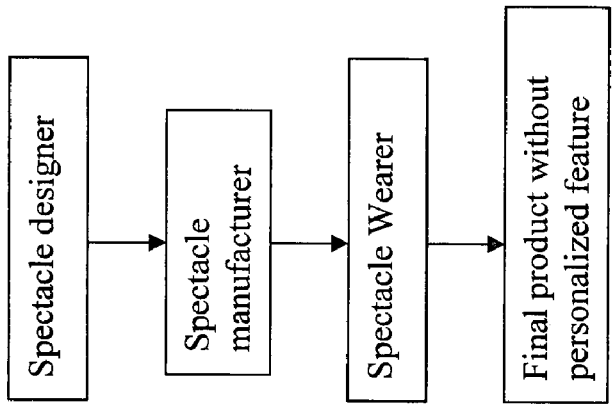
FIGS. 6A and 6B are flow diagrams of the method of configuring the spectacle frame of the present invention in comparison with a conventional method of the spectacle frame.
Figure 6A:
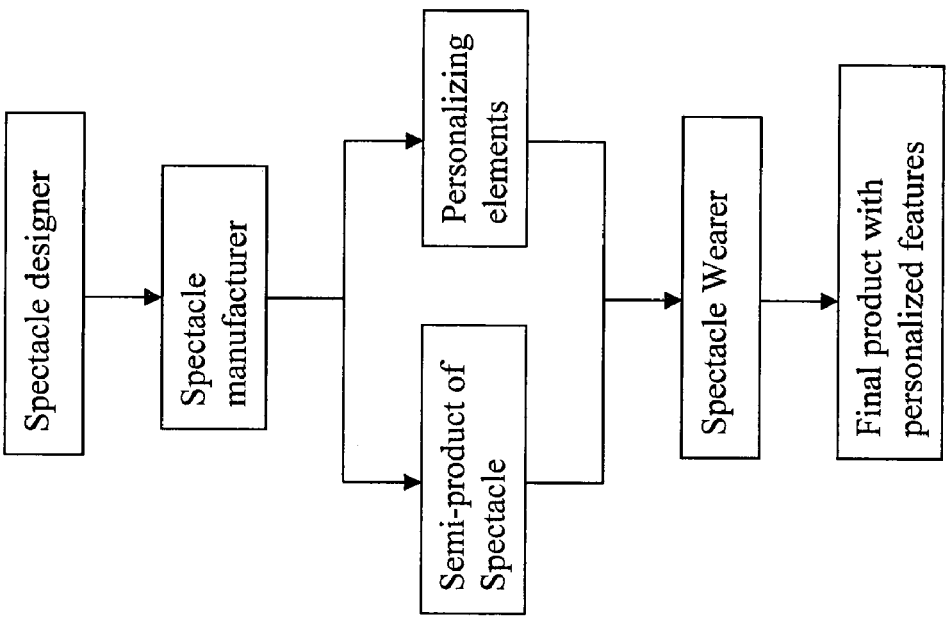

In addition, the present invention contains the main distinctive feature that the conventional spectacle frame cannot achieve. As shown in FIGS. 6A and 6B, the conventional method of configuring the spectacle frame is that all the spectacle frames are designed by the spectacle designer. Then, the spectacle manufacturer follows the design of the spectacle frame for mass production. Therefore, the wearer can only select the particular design of the spectacle frame. In other words, the wearer does not involve in any step to design or configure his or her own spectacle frame. According to the present invention, after the spectacle frame is manufactured, the wearer is able to select the personalizing elements 31, 31', 31" as an add-on personal decorative item to personify the spectacle frame such that the wearer is able to be a secondary spectacle designer to design or configure his or her own spectacle frame. For example, a couple can select a pair of corresponding personalizing elements 31, 31', 31" to add on their spectacle frame as if they select the couple rings. In addition, the wearer is able to carry two or more personalizing elements 31, 31', 31" with different styles, colors, and/or materials daily such that he or she is able to interchange the personalizing elements 31, 31', 31" at any occasion without carrying two or more spectacle frames at the same time.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacle frame, comprising:
two lenses;
a frame body holding said two lenses in position, wherein said frame body has a personalizing portion, wherein said frame body comprises two lens rims encircling said two lenses to hold sad lenses in position, a lens bridge extended between two inner sides of said lens rims, and two side extensions extended from two outer sides of said lens rims respectively, wherein each of said side extensions comprises a decorative rim defining an engaging compartment therewithin; and an interchangeable decorative arrangement, which comprises one or more personalizing elements detachably and interchangeably affixing at said personalizing portion of said frame body, wherein said personalizing element, having a shape corresponding to said personalizing portion of said frame body, forms an add-on personal decorative item to personify said frame body so as to enhance an aesthetic appearance of said spectacle frame, wherein said personalizing portion is formed at each of said side extensions such that said personalizing elements are detachably attached to said side extensions respectively to personify said frame body, wherein each of said personalizing elements comprises a decorative panel, having a shape and size corresponding to said engaging compartment, fittingly receiving in said engaging compartment so as to hold said personalizing element on said respective side extension, wherein said engaging compartment is a through slot formed at said respective side extension, wherein said interchangeable decorative arrangement further comprises a mounting unit which contains a plurality of engaging slots spacedly formed along a peripheral edge of each of said personalizing elements and comprises a plurality of engaging arms which are spacedly extended from said decorative rim within said engaging compartment and are detachably engaged with said engaging slots respectively so as to lock up said personalizing elements at said side extensions respectively.

2. The spectacle frame, as recited in claim 1, wherein said personalizing element and said frame body are made of different materials.

3. The spectacle frame, as recited in claim 1, wherein said frame body further comprises two temples and two temple connectors for detachably and pivotally coupling said temples with said side extensions respectively, wherein each of said temple connectors comprises a connector piece, having a plurality of spaced apart pivot slots, extended from an end of said respective temple, and a connector head, having a plurality of spaced apart connector plugs, extended from said respective side extension, wherein said connector plugs of said connector head are detachably inserted into said pivot slots of said connector piece respectively so as to allow said temple pivotally and detachably coupling with said respective side extension.

4. A spectacle frame, comprising:
two lenses;
a frame body holding said two lenses in position, wherein said frame body has a personalizing portion, wherein said frame body comprises two lens rims encircling said two lenses to hold sad lenses in position, a lens bridge extended between two inner sides of said lens rims, and two side extensions extended from two outer sides of said lens rims respectively, wherein each of said side extensions comprises a decorative rim defining an engaging compartment therewithin; and
an interchangeable decorative arrangement, which comprises one or more personalizing elements detachably and interchangeably affixing at said personalizing portion of said frame body, wherein said personalizing element, having a shape corresponding to said personalizing portion of said frame body, forms an add-on personal decorative item to personify said frame body so as to enhance an aesthetic appearance of said spectacle frame, wherein said personalizing portion is formed at each of said side extensions such that said personalizing elements are detachably attached to said side extensions respectively to personify said frame body, wherein each of said personalizing elements comprises a decorative panel, having a shape and size corresponding to said engaging compartment, fittingly receiving in said engaging compartment so as to hold said personalizing element on said respective side extension, wherein said engaging compartment is indently formed at said respective side extension, wherein said interchangeable decorative arrangement further comprises a mounting unit which contains an engaging groove indently formed at a wall of said engaging compartment and comprises an engaging tongue which is protruded from a surface of said personalizing element and is slidably engaged with said engaging groove so as to lock up said personalizing element at said respective side extension.

5. The spectacle frame, as recited in claim 4, wherein said personalizing element and said frame body are made of different materials.

6. The spectacle frame, as recited in claim 4, wherein said frame body further comprises two temples and two temple connectors for detachably and pivotally coupling said temples with said side extensions respectively, wherein each of said temple connectors comprises a connector piece, having a plurality of spaced apart pivot slots, extended from an end of said respective temple, and a connector head, having a plurality of spaced apart connector plugs, extended from said respective side extension, wherein said connector plugs of said connector head are detachably inserted into said pivot slots of said connector piece respectively so as to allow said temple pivotally and detachably coupling with said respective side extension.

7. A spectacle frame, comprising:
two lenses;
a frame body holding said two lenses in position, wherein said frame body has a personalizing portion, wherein said frame body comprises two lens rims encircling said two lenses to hold said lenses in position, a lens bridge extended between two inner sides of said lens rims, and two side extensions extended from two outer sides of said lens rims respectively, wherein said frame body further comprises two temples and two temple connectors for detachably and pivotally coupling said temples with said side extensions respectively, wherein each of said temple connectors comprises a connector piece, having a plurality of spaced apart pivot slots, extended from an end of said respective temple, and a connector head, having a plurality of spaced apart connector plugs, extended from said respective side extension, wherein said connector plugs of said connector head are detachably inserted into said pivot slots of said connector piece respectively so as to allow said temple pivotally and detachably coupling with said respective side extension; and
an interchangeable decorative arrangement, which comprises one or more personalizing elements detachably and interchangeably affixing at said personalizing portion of said frame body, wherein said personalizing element, having a shape corresponding to said personalizing portion of said frame body, forms an add-on personal decorative item to personify said frame body so as to enhance an aesthetic appearance of said spectacle frame, wherein said personalizing portion is formed at an upper portion of each of said lens rims and at said lens bridge which is integrally extended between said upper portions of said lens rims, wherein said personalizing element comprises an elongated decorative strip detachably engaging with said upper portions of said lens rims and said lens bridge, wherein said interchangeable decorative arrangement further comprises a mounting unit which contains a plurality of engaging grooves indently formed at said upper portions of said lens rims and said lens bridge of said frame body at a front side thereof, and comprises a plurality of engaging tongues which are protruded from a surface of said personalizing element and are slidably engaged with said engaging grooves respectively so as to lock up said personalizing element at said at front side of said frame body.

8. A spectacle frame, comprising:

two lenses;

a frame body holding said two lenses in position, wherein said frame body has a personalizing portion, wherein said frame body comprises two lens rims encircling said two lenses to hold sad lenses in position, a lens bridge extended between two inner sides of said lens rims, and two temples pivotally extended from two outer sides of said lens rims respectively, wherein each of said temples contains an engaging compartment formed at said outer side thereof; and an interchangeable decorative arrangement, which comprises one or more personalizing elements detachably and interchangeably affixing at said personalizing portion of said frame body, wherein said personalizing element, having a shape corresponding to said personalizing portion of said frame body, forms an add-on personal decorative item to personify said frame body so as to enhance an aesthetic appearance of said spectacle frame, wherein said personalizing portion is formed at each of said temples such that said personalizing elements are detachably attached to outer sides of said temples respectively to personify said frame body, wherein each of said personalizing elements comprises an elongated decorative panel, having a shape and size corresponding to said engaging compartment, fittingly receiving in said engaging compartment so as to hold said personalizing element on said respective temple, wherein said interchangeable decorative arrangement further comprises a mounting unit which contains a plurality of engaging slots spacedly formed along said outer side of each of said temples and comprises a plurality of engaging arms which are spacedly protruded from each of said personalizing elements and are detachably engaged with said engaging slots respectively so as to lock up said personalizing elements at said outer sides of said temples respectively.

9. The spectacle frame, as recited in claim 8, wherein said personalizing element and said frame body are made of different materials.

10. The spectacle frame, as recited in claim 8, wherein said frame body further comprises two temple connectors for detachably coupling said temples with said lens rims respectively, wherein each of said temple connectors comprises a connector piece, having a plurality of spaced apart pivot slots, extended from an end of said respective temple, and a connector head, having a plurality of spaced apart connector plugs, extended from said outer side of said respective lens rim, wherein said connector plugs of said connector head are detachably inserted into said pivot slots of said connector piece respectively so as to allow said temple pivotally and detachably coupling with said respective lens rim.

* * * * *